United States Patent Office 3,003,146
Patented Oct. 3, 1961

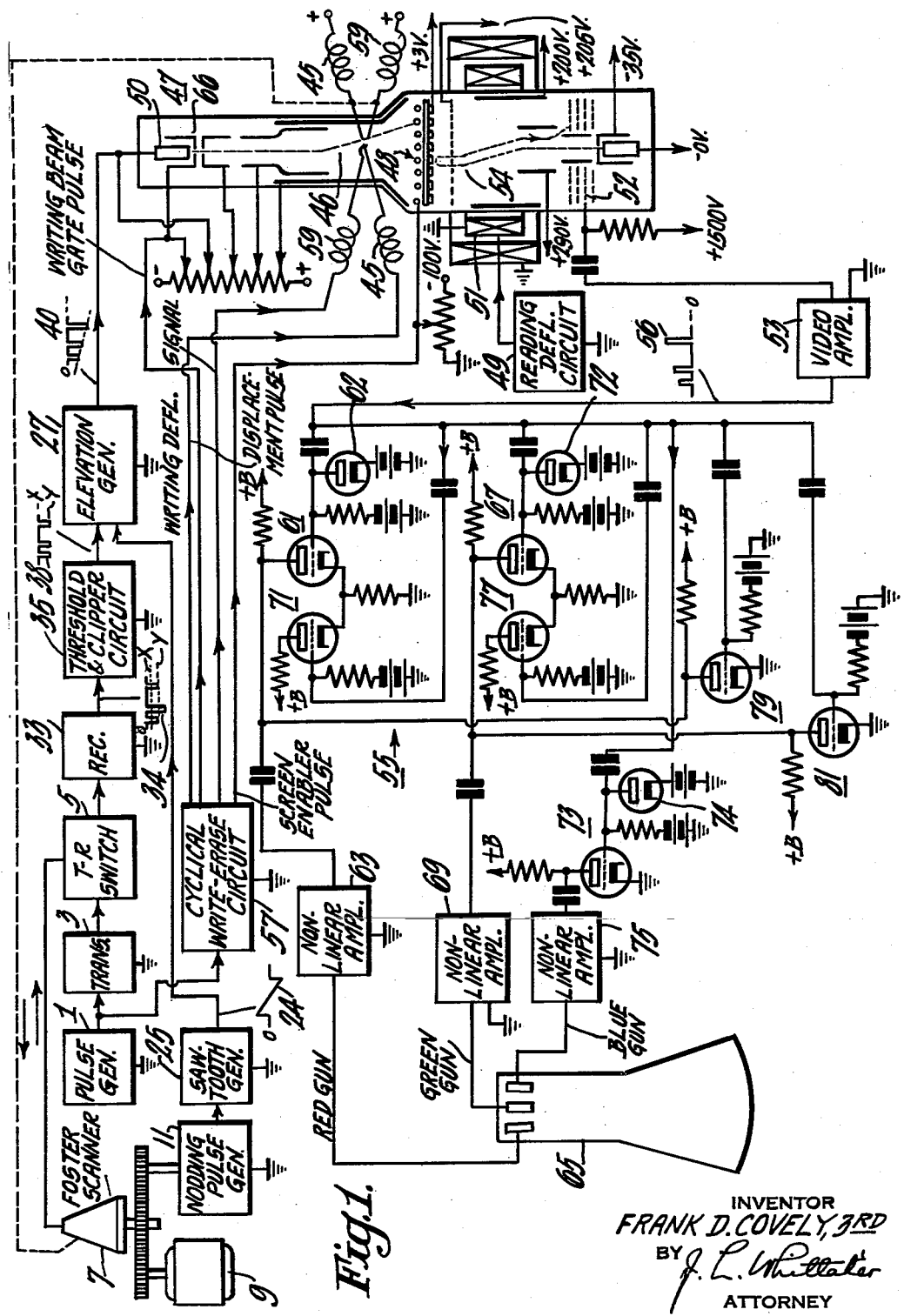

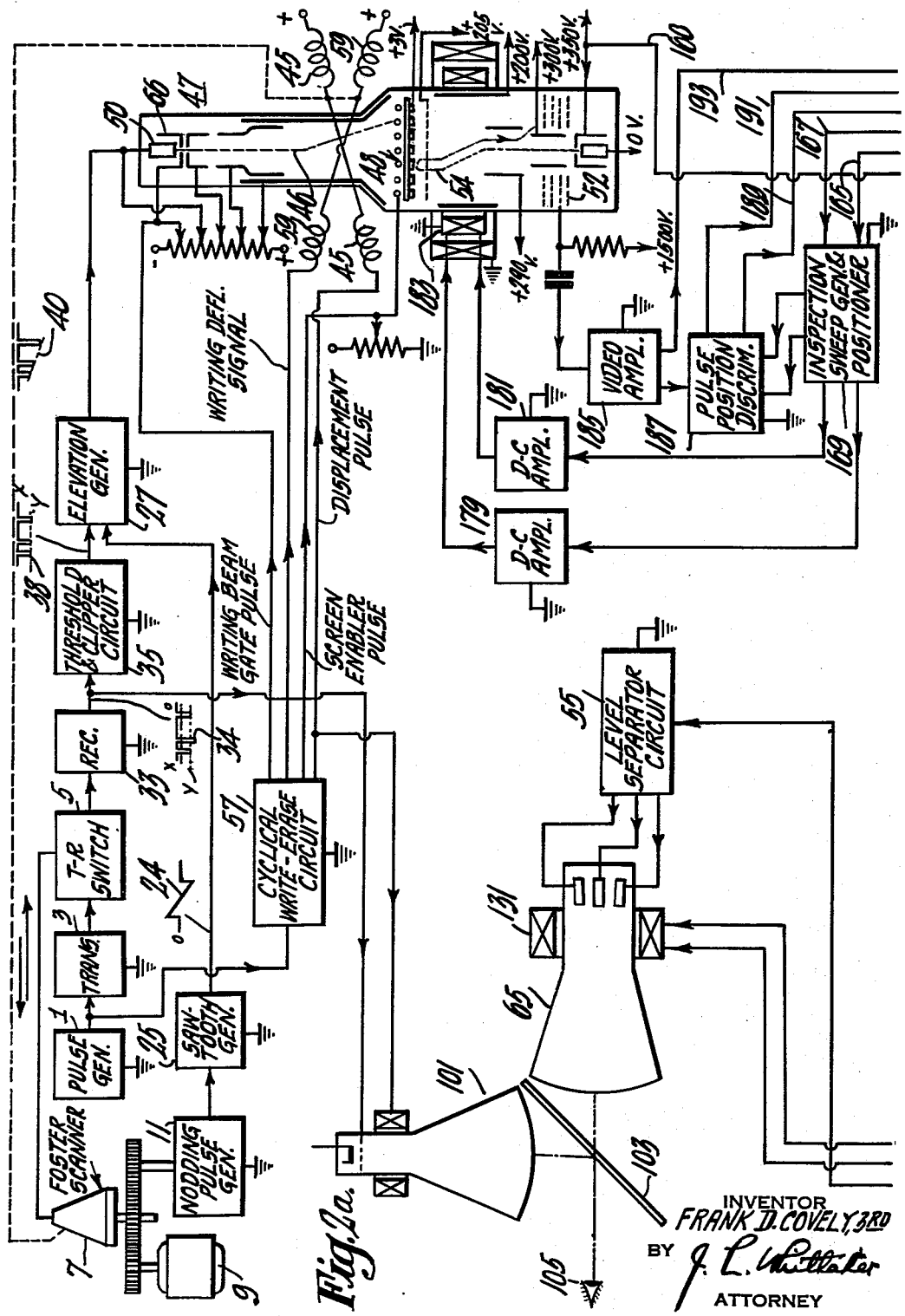

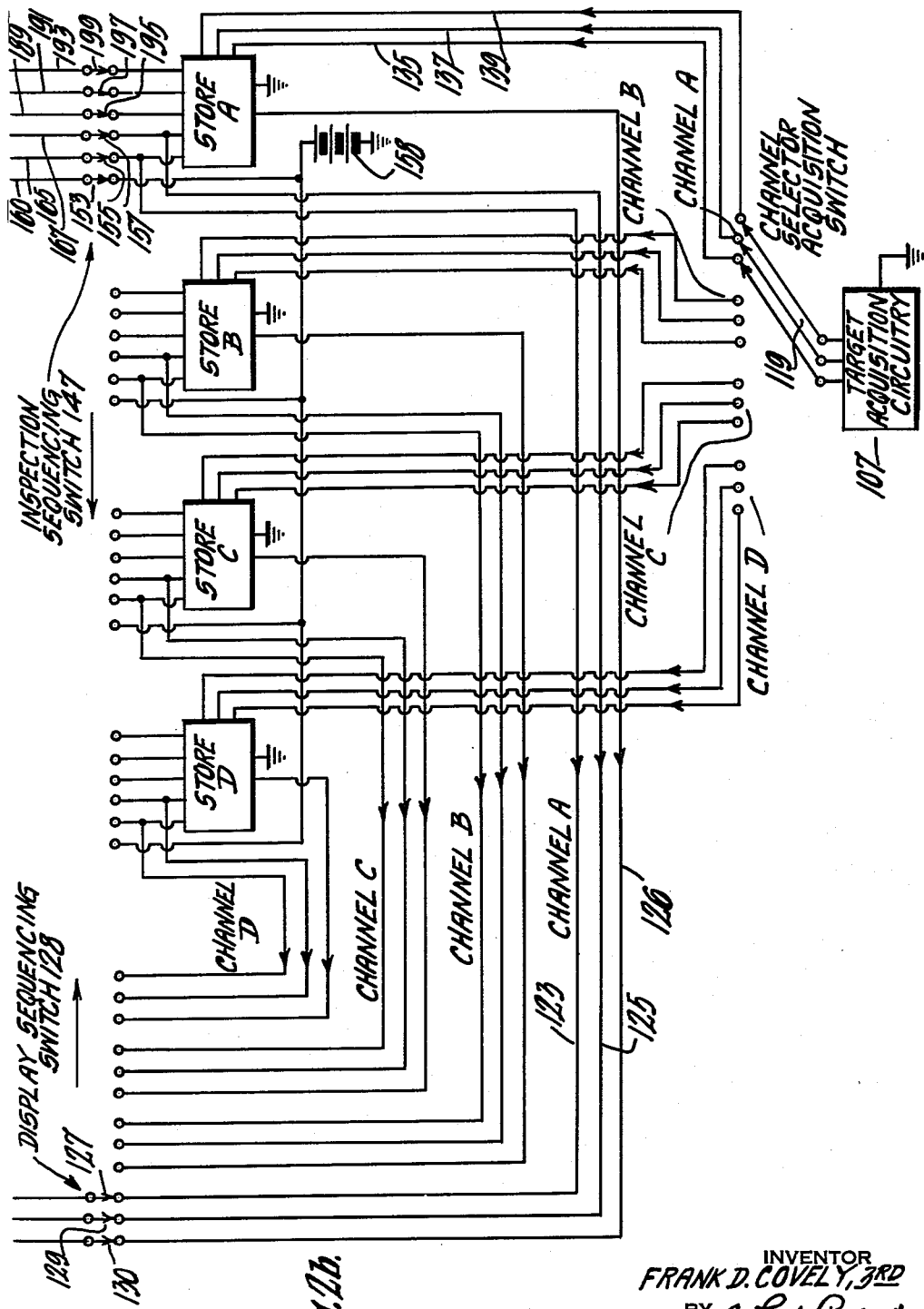

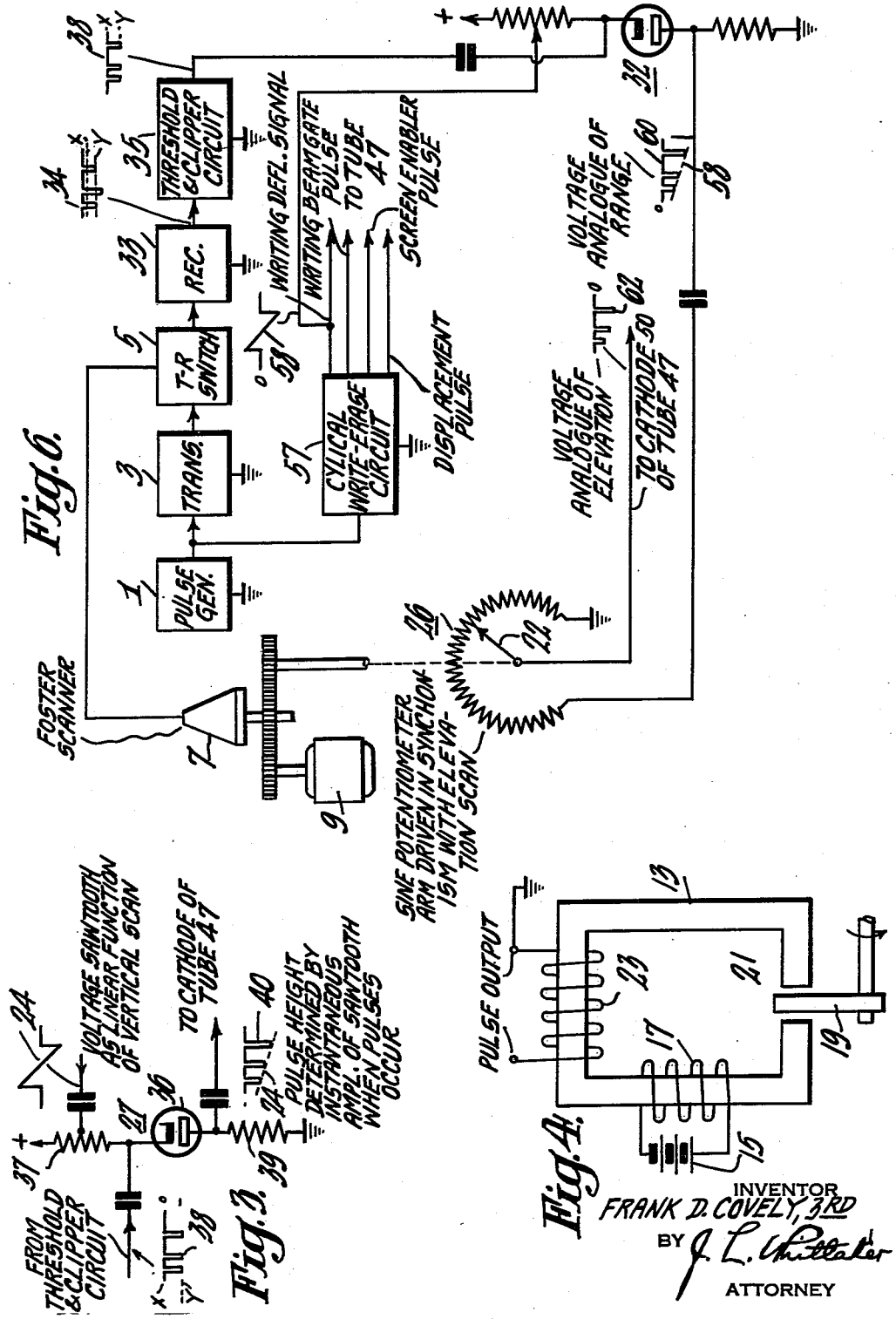

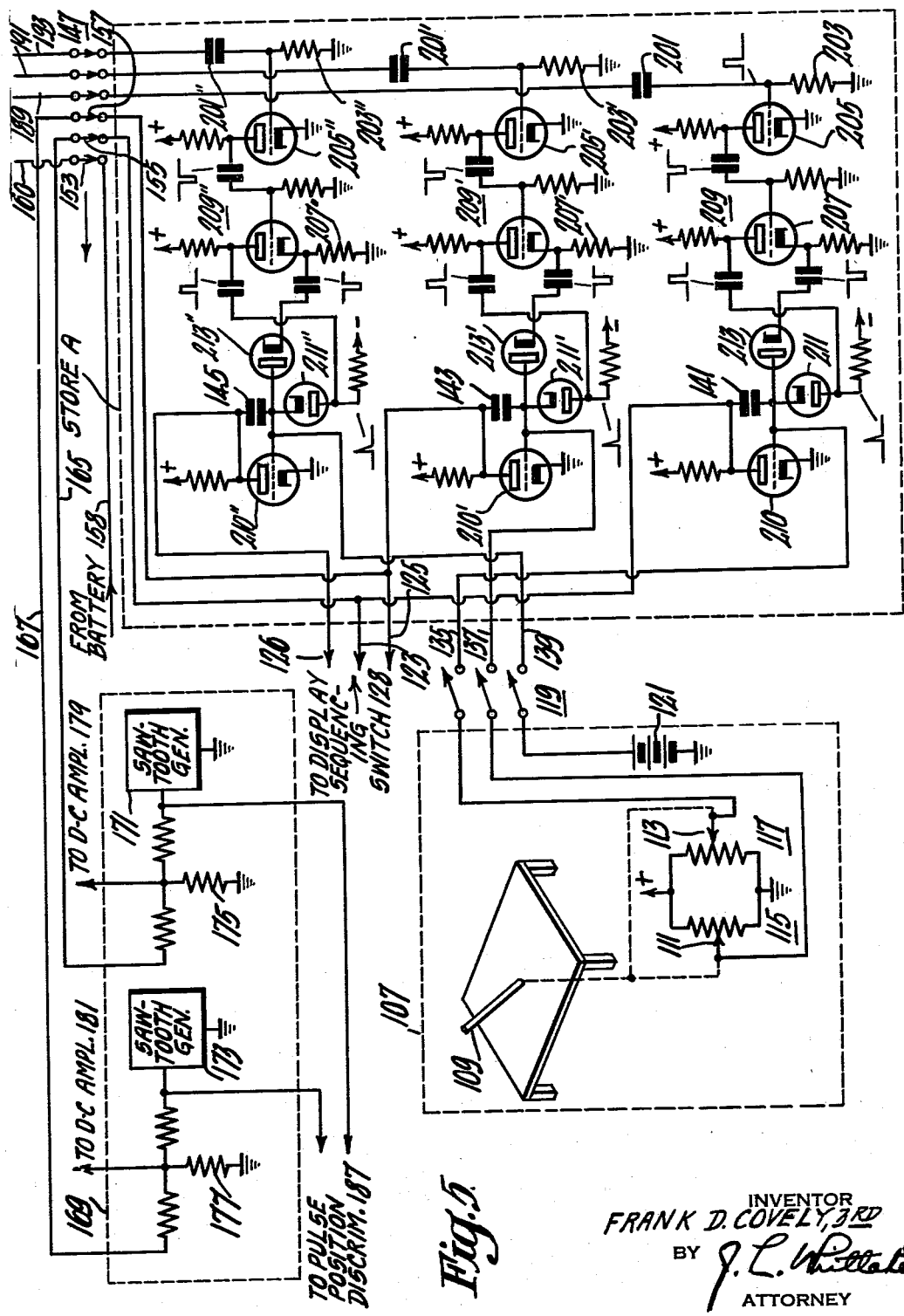

3,003,146
METHODS AND MEANS FOR PROVIDING A THREE-DIMENSIONAL SIGNAL DISPLAY
Frank D. Covely, 3rd, Collingswood, N.J., assignor to Radio Corporation of America, a corporation of Delaware
Filed Apr. 29, 1952, Ser. No. 284,919
12 Claims. (Cl. 343—7.9)

This invention relates generally to signal recording and/or display systems and more particularly to improved methods and means for recording three-dimensional information on a two-dimensional medium.

Systems for displaying three-dimensional information are particularly useful in radio navigation systems adapted for aircraft control. In one known system a PPI (plan position indication) type display is afforded in which the length of the trace of a given image is a measure of the elevation of the radar target object corresponding thereto. Other systems may be employed in connection with and supplemental to instrument landing and ground control of approach radar systems wherein ground station apparatus provides information substantially continuously as to the range, azimuth, and elevation angle or altitude of an aircraft as it approaches for a landing. This type of system is described in U.S. Patent No. 2,549,641, granted to Harold John Schrader on April 17, 1951, and entitled "Display of Three-Dimensional Information." Still other three-dimensional display arrangements employ optical systems for stereoptically viewing images whereby the impression of depth is afforded.

While the above systems perform reasonably well in displaying three-dimensional information, the pictorial displays provided become complicated and difficult to interpret when a large number of images representative of differently located target objects are to be displayed and the information derived therefrom analysed rapidly. Also, the Schrader system primarily is adapted for use only with instrument landing and ground control of approach radar systems. What is required is a system flexible in application providing a relatively simple three-dimensional display which may be rapidly interpreted and is capable of displaying information representative, for example, of a large number of aircraft at different ranges, azimuths, and elevations.

It is the principal object of the present invention to provide improved methods and means for recording three-dimensional information.

Another object of the invention is to provide a simplified display of three-dimensional information.

Another object is to provide an improved system for displaying three-dimensional information representative of the range, azimuth, and elevation characteristics of a large number of radar target objects.

Another object is to provide a system of the type described wherein the three-dimensional display of a large number of target objects may be readily analyzed and interpreted.

A further object of the invention is to provide a three-dimensional display in which one characteristic thereof intensity-modulates a different characteristic.

A further object of the invention is to provide a three-dimensional display in color.

Another object of the invention is to provide a system for automatically tracking radar targets in three-dimensions.

Another object is to provide three-dimensional information relative to selected target objects for control purposes.

A still further object of the invention is to provide a three-dimensional automatic-track-while-scan system in which time multiplexing enables a single signal conveying channel to be utilized in tracking a plurality of radar target objects.

In a typical embodiment according to the invention, the writing beam of an electrical storage tube having writing and reading electron beams is deflected in accordance with the azimuth characteristic of the three-dimensional information to be displayed. The range characteristic is derived, for a selected azimuth bearing, by radiating high power radio-frequency electrical pulses into space for reflection and/or retransmission by radar target objects within the range of the transmission system. The radiated energy configuration preferably is that of a "pencil" shaped beam which linearly and electronically scans rapidly in elevation. The amplitude of the echo signals comprising the echo wave trains produced by this elevation scanning are then controlled as a function of the elevation characteristic of the target objects producing the echoes. The storage tube writing beam is then modulated with the amplitude-controlled wave trains to establish a variable intensity charge pattern on the signal storage medium whereby the amount of charge deposited is proportional to the elevation angle or altitude of the individual target.

In a practical system to be employed generally for aircraft control, it is apparent that many radar echoes from a plurality of aircraft may appear on the particular display medium afforded. To facilitate interpreting and analyzing this information a further feature of the invention includes displaying echoes of aircraft at different elevation angles or altitudes as images having different colors or hues of color. Assuming that a PPI (plan position indicator) type of presentation is desirable and is established to provide range and azimuth information, the different radar images may be displayed in different colors indicative of the altitudes of the craft corresponding thereto. For example, an aircraft displayed in red may be operating at an altitude of between five hundred feet and one thousand feet while an orange indication may convey the information that a craft at a particular slant range and bearing is at an altitude of between two and three thousand feet. Also, the hues of the different colors may be utilized to indicate in which portion of a given strata the plane or planes are located (i.e. gradations of red, orange, green, etc.).

The invention, and various applications thereof, will be described in greater detail with reference to the accompanying drawings in which FIGURE 1 is a circuit diagram, partially in block form, of a three-dimensional signal display system, according to the invention; FIGURES 2-a and 2-b show a modification of the system of FIGURE 1 for automatically tracking objects in three-dimensions; FIGURE 3 is a schematic circuit diagram of an elevation generator for use in the systems of FIGURES 1 and 2-a and 2-b whereby a voltage analogue of target elevation angle is afforded; FIGURE 4 is a circuit diagram of a pulse generator utilized in the systems of FIGURES 1 and 2-a and 2-b; FIGURE 5 is a detailed schematic circuit diagram of portions of the tracking system of FIGURES 2-a and 2-b; and FIGURE 6 is a schematic circuit diagram, partially in block form, of structure for obtaining a voltage analogue of target elevation.

Similar reference characters are applied to similar elements throughout the drawings.

Three-dimensional display system

Referring to FIGURE 1, a pulse generator 1 provides a series of pulses at a predetermined pulse repetition rate to key a transmitter 3 to produce a series of high power output pulses. The transmitter pulses are coupled through a T-R (transmit-receive) switch 5 for radiation from an antenna 7 at a selected azimuth bearing. The energy configuration radiated by the antenna preferably is that of a "pencil" beam which linearly scans a defined sector of space in elevation. An antenna especially suitable for use in the system of the instant invention is described in U.S. Patent No. 2,521,844, granted to Walter O. Gordy on September 12, 1950. This antenna is generally known as the Foster scanner and hereinafter will be referred to as such. The Foster scanner 7 includes a rotatable truncated cone contained within a stationary cone. A drive motor 9 is mechanically coupled to and drives the rotor member (not shown) at some constant angular velocity which is a function of the rate at which it is desirable to scan in elevation.

In the present example it will be assumed that the pencil beam lobe scans from a fiducial point (such as the horizon) to points progressively greater in elevation angle. For a given elevation scan the transmitter 3 may be keyed as many as fifty times, each of the fifty lobes of energy being directed to scan a sector of elevation slightly greater in elevation angle than the sector scanned by the immediately preceding lobe.

A "nodding" pulse generator 11 is provided for producing an electrical pulse each time an elevation scan is initiated. A relatively simple structure is shown in FIGURE 4 which is suitable for generating these pulses. Referring to FIGURE 4, magnetic lines of flux are set up within a magnetic core 13 by current from a source 15 flowing through a coil 17 wound about the core. At the time at which the Foster scanner begins an elevation scan, a vane 19 passes through the core air gap 21 and instantaneously changes the reluctance of the magnetic loop. A different winding 23 coupled to the core may be employed to derive a pulse output in response thereto. The pulses thus derived may be suitably shaped, if necessary, and applied to the sawtooth generator 25 of FIGURE 1. The pulse duration of the sawtooth signals 24 produced by the generator 25 is substantially equal to the time required for a complete elevation scan. The sawtooth signals are then applied to an elevation generator 27, the operation of which will be explained later.

Pulse echo signals reflected or retransmitted by target objects (not shown) in response to the aforesaid elevation scanning are coupled from the scanner 7 through the T-R switch 5 to a radar receiver 33 wherein the radiofrequency echo pulses are amplified and demodulated. The video wave signal train output 34 of the receiver is applied to a threshold and clipper circuit 35 in which the wave train is operated upon to produce what may be termed a "synthetic" video or video information devoid of normal variations in its amplitude characteristic. The circuit 35 comprises a clipper tube biased to threshold the video echo pulses whereby only signals above a predetermined noise level X are passed. Also, the wave train amplitude is limited to a value Y so that substantially all the video echo pulses are of the same amplitude. Thus the circuit functions to "slice-off" the tops and bottoms of the video signals to produce a constant amplitude wave train. The wave train 38 is then applied to the above-mentioned elevation generator 27, one form of which is described by reference to FIGURE 3.

Referring to FIG. 3, the generator 27 comprises a diode 36 having a cathode electrode connected to a source of positive potential through a resistor 37. The tube anode is connected to the system common ground connection through an anode resistor 39. The previously-mentioned sawtooth signal 24 derived from the generator 25 is developed across the cathode resistor 37 as are the negative going "synthetic" video signals 38 from the threshold and clipper circuit 35. The positive potential applied to the cathode is such that the maximum negative value of the sawtooth signal 24 does not cause the diode to conduct. The amplitude of the output video pulses 40 developed across the anode resistor 39 are then a function of the instantaneous amplitude of the sawtooth signal 24 at the time at which the input signals 38 are compared therewith. When the pencil beam is searching a sector at a relatively low elevation angle, the amplitude of the elevation generator output pulse is relatively small whereas scanning at a fairly high elevation angle produces a pulse of substantially greater amplitude. The amplitude of the video wave train is thus effectively compared with the sawtooth reference signal and controlled in accordance with the elevation angle of target objects corresponding to the individual echoes.

Referring again to FIG. 1, the pulse signals from the generator 1 which are used to key the transmitter 3 also are utilized to trigger range sweep signals. Assuming that the transmitter 1 is keyed to produce fifty lobes of energy during one elevation scan, fifty sawtooth range sweep signals are produced which are coupled to the writing deflection coils 59 of an electrical storage tube 47. A storage tube preferred for use in the instant system is a half-tone tube such as described in a copending application, Serial No. 259,344, filed on December 1, 1951, by L. Pensak and entitled "Storage Tube," now U.S. Patent No. 2,728,020, issued December 20, 1955. One of the advantages of the half-tone tube is the different amplitude signals lying between the maximum and minimum amplitude signals applied to the tube are readily distinguishable. This is particularly important in the present invention wherein the relative intensities of charge of different signals stored in the tube subsequently are utilized to provide an indication of the elevation angle or altitude of radar targets. The above-mentioned deflection signals radially deflect the writing beam 46 of the tube to establish a PPI type of charge pattern on the two-dimensional storage screen 48 thereof. The screen 48 comprises a storage insulator interposed between two screen electrodes. The screen on the writing gun side of the tube is spaced a predetermined distance from the insulator while the screen on the reading gun side of the tube is supported by said storage insulator. The amplitude controlled wave trains 40 from the elevation generator 27 are applied to a beam control electrode 50, such as the cathode, of the storage tube to modulate the writing beam 46 and establish a variable intensity charge pattern on the storage screen 48 in accordance therewith.

Thus it may be seen that the writing beam of the storage tube may be deflected across the screen 48 along preselected paths a large number of times during an elevation search at each preselected azimuth bearing. A range sweep is provided for the writing of data obtained in response to the propagation of each of the generated lobes of energy. The number of lobes generated need not necessarily be fifty as described in the present example, but may be any convenient number since the number of lobes generated depends upon the elevation accuracy required and the total elevation angle to be searched. The generation and propagation of many energy lobes which linearly and electronically scan sectors of space progressively higher in elevation angle effectively causes the pencil beam radiated by the antenna to "nod" through the prescribed search sector. The plurality of wave trains responsive to said lobes are each controlled in amplitude by the instantaneous amplitude of the sawtooth reference signal as a function of elevation angle of corresponding radar targets to charge-modulate the storage tube target screen 48 in accordance therewith.

The PPI type charge pattern thus stored in the tube 47 may be visually displayed by applying television type deflection signals from a source 49 to the reading deflection coils 51 of the storage tube 47. The storage tube reading beam 54 is then deflected across the screen 48 and is modulated in accordance with the intensity of the charge of signals stored thereon. The modulated electron beam may then be amplified within the tube in an electron multiplier 52, and then amplified in a video amplifier 53, and applied to a conventional kineoscope (not shown). The pictorial display afforded by the kinescope comprises light ray image signals displayed in PPI form on the screen of the kinescope, the image signals being located according to the ranges and azimuths of the target objects corresponding thereto. The intensity of charge of each signal displayed affords a measure of the elevation angle or altitude of each target.

Since the process of reading the signal charges stored in the half-tone tube 47 does not erase said charges, a separate erasing arrangement is required. To this end, a cyclical write-erase circuit 57 may be employed in connection with a pair of auxiliary deflection coils 45 in phase quadrature with the writing sweep deflection coils 59. Initially the write-erase circuit 57 is triggered by the pulse generator 1 to produce PPI range sweep signals for deflecting the writing beam 46. In the flyback interval following each PPI writing operation, separate signals are produced by the write-erase circuit 57 which substantially simultaneously are (a) coupled to the auxiliary deflection coils 45 displacing the writing beam several PPI lines in the direction of writing, (b) applied to the half-tone tube target screen 48 enabling the screen for erasure, and (c) applied to the control grid 66 of the half-tone tube 47 turning on its writing beam 46 which is utilized for erasure. This erasing arrangement provides for erasure of old information immediately in advance of the writing of new information and affords an up-to-date store of target data. A more detailed description of this erasing arrangement is provided in my copending application, Serial No. 262,377, filed December 19, 1951, and entitled "Scan Conversion System With Progressive Cyclical Erasure," now U.S. Patent No. 2,718,609, issued September 20, 1955.

While the display afforded as described above may be satisfactory for viewing signal indications from a small number of targets, it is difficult for the human eye to appreciate small intensity variations in image signals closely adjacent each other and even more difficult to compare signal intensities when the images are not closely situated. For this reason the above monochrome display is not preferred, and according to a further feature of the invention, a level separator circuit 55 is provided which is responsive to the different levels of video signals for displaying such signals in characteristic colors.

*Level separator and color display*

Referring more particularly to FIGURE 1 and to the level separator circuit indicated generally by the numeral 55, positive going echo pulses 56 comprising the variable amplitude wave train from the video amplifier 53 are applied to the grid electrode of an amplifier 61 to neutralize the negative bias thereof. When the amplifier 61 conducts, a signal is produced in the amplifier output circuit which may be applied through a non-linear amplifier 63 to turn on one of the electron guns of a tri-color kinescope 65 such as described in an article by H. B. Law, entitled "A Three Gun Shadow Mask Kinescope," appearing at page 1186 of the October 1951 issue of the Proceedings of the I.R.E. The particular electron gun pulsed may be that which produces a red image signal on the phosphor screen thereof. When the video signal amplitude level is substantially greater, the bias of a different amplifier 67 is neutralized and conduction occurs therein. The signal appearing in its output circuit may also be applied to a non-linear amplifier 69 and thence to the green gun of the tri-color tube. The addition of the green to the red produces an orange color as a signal indication. If the video signal amplitude is still greater an amplifier 71, having a cathode electrode commonly connected to the cathode of the first named amplifier 61, conducts, thus biasing off the amplifier 61. This biasing off turns off only the kinescope red gun and results in a green display.

In a like manner an even greater amplitude signal causes another amplifier 73 to conduct producing a signal which may be coupled through a third non-linear amplifier 75 to enable the blue gun of the tri-color tube 65. This affords a blue-green kinescope display. A further increase in signal level causes conduction in an amplifier 77, cathode coupled to the amplifier 67, whereby said amplifier 67 is cutoff. Green is then removed from the display and only a blue indication is afforded. A higher signal level neutralizes the bias on a further amplifier 79 again turning on the red gun thereby mixing red color with blue color. The highest amplitude signal neutralizes the bias on a further amplifier 81 turning on the green gun to add green color to the mixture of red and blue thereby providing a white indication. In the event that the conduction characteristics of the cathode coupled amplifiers is such that conduction of either amplifier 71 or 77 does not sufficiently cut off current flow in amplifiers 61 or 67, diode limiters 62 and 72 may be disposed in the grid circuits of the amplifiers 61 and 67 to prevent conduction therein. Also, these two diodes 62 and 72 and a diode 74 in the grid circuit of the amplifier 73 afford the advantage of limiting the positive excursions of the video signals appearing at the grids of the amplifiers coupled thereto whereby discrete steps of color may be achieved. If this limiting action were not afforded, the red amplifier (for example) would drive the red gun of the color tube much harder than it should when the green gun also is turned on. There would then be too much red in the red-green display.

In the event that a pulse height analogue of altitude is desired instead of the pulse height elevation angle analogue, the circuit of FIGURE 1 may be modified substantially as shown in FIGURE 6. Referring to FIGURE 6, each of the pulses generated by the generator 1 triggers a sawtooth generator in the write-erase circuit 57 to produce range sweep deflection signals 58. These deflection signals, along with the echo signals 38 from the threshold and clipper circuit 35, are applied to a circuit 32 similar to the elevation generator described with reference to FIGURE 3. The relative occurrence of the thresholded pulses 38 with respect to the sawtooth deflection signal 58 causes output signals 60 to be produced having amplitudes proportional to the range of targets corresponding thereto. The range analogue pulses are then applied to a sine wound potentiometer 26 such as described at page 284, volume 17 of the M.I.T. Radiation Laboratory Series. The movable arm 22 of the sine potentiometer is geared to and driven in synchronism with the elevation scanning of the antenna 7. The voltage picked off thereby is then $$V_E = V_R \cos \phi$$

where $V_E$ is the voltage analogue of elevation, $V_R$ is the voltage analogue of range, and $\phi$ is the instantaneous value of the elevation angle of the scanner at the time at which the potentiometer 26 is pulsed with $V_R$. The voltage analogue of elevation pulses 62 may then be applied to the cathode 50 of the storage tube 47 to modulate the writing beam thereof. The altitude data may be read out of the storage tube 47 in a manner identical to that described previously with reference to the storage of elevation angle data. The altitude analogue pulses are then applied to the level separator circuit 55 and displayed on the color tube 65.

As shown above, seven discrete colors are available, the color steps being controlled by the bias setting of each amplifier. The seven steps may represent seven sectors of elevation angle. By employing the range-height structure shown in FIGURE 6 these colors may be made to represent strata of altitude. In the event that it is not necessary to pulse the tri-color tube electron guns with substantially constant amplitude signals, the non-linear amplifiers 63, 69, and 75 may be omitted. By the omission of these amplifiers different hues of the seven basic colors may be obtained. For example, a red indication may convey the information that an aircraft is at a given range and bearing and is operating in an altitude layer of between five hundred and one thousand feet. The particular hue of red, however, may indicate that the craft is nearer to an altitude of one thousand feet. Video amplifiers, dampers, and color balance circuits for the operation of the color tube 65 have been omitted for the purpose of simplicity since these practices are well known, for example, as described in the RCA Review, volume XI, No. 2, pp. 228–232.

Three-dimensional target tracking system

Referring to FIGURES 2–a and 2–b, a modification of the foregoing system is shown which may be employed for the radar target automatic tracking in three-dimensions while the antenna is scanning. Echo signal indications derived from the hemispheric azimuth and elevation scanning by the Foster scanner 7 may be displayed on the screen of a conventional kinescope 101 in the form of a PPI type signal presentation and the light ray signals thereof reflected by a semi-reflector 103 for viewing at a point as indicated at 105. Suitable semi-reflectors may include either a half-silvered mirror or a dichroic mirror. A tri-color kinescope 65 is disposed opposite the viewing side of the semi-reflector 103.

Assuming that the system is designed for simultaneously tracking a large number of radar targets and that one particular target appearing in the conventional display is to be tracked, the system operation is substantially as follows. Referring to FIGURE 2–b, a storage channel is selected for storing the coordinate data of the given target by actuating three pole multi-throw acquisition switch 119 thereby connecting target acquisition circuitry 107 to the selected channel A. Referring to FIGURE 5, and with switch 119 closed, a mechanical member 109 may be utilized initially to select the target to be tracked and may take any convenient form such as a joystick. The left-right up-down movement of the joystick controls, respectively, the positions of the movable arms 111 and 113 of two potentiometers 115 and 117. These potentials and a positive potential from a battery 121 are then applied to the storage unit of the selected channel A.

The potentiometer voltages are coupled by the leads 135 and 137 and the battery voltage is coupled by lead 139 to charge storage capacitors 141, 143, and 145, respectively, of store A to voltages proportional thereto. The voltages to which capacitors 141 and 143 are charged are coupled by leads 123 and 125 through switch arms 127 and 129 of a display sequencing switch 128 to the deflection circuits 131 of the color kinescope 65.

Simultaneously, the voltage to which capacitor 145 is charged is coupled by lead 126 through switch arm 130 of the sequencing switch 128 to the level separator circuit 55, described more fully above with reference to FIGURE 1, turning on, for example, the green gun of the tube 65. The joystick is then manipulated until the green image and the selected image in the conventional display 101 are in superposition. At that particular time the correct X–Y coordinates of the selected target have been obtained and stored in capacitors 141 and 143. The acquisition switch 119 may then be opened for the selection of a different channel for tracking a different target and the position of the joystick moved without disturbing or changing the signals stored in store A. In a practical automatic-track-while-scan system it may be desirable to track simultaneously as many as a hundred radar targets. For simplicity only four storage channels (A, B, C, and D) are shown here. It is pointed out that the battery 121 is utilized only to produce a color spot for target acquisition and that the voltage to which capacitor 145 is initially charged is subsequently corrected to a value proportional to the altitude of the target to which that particular storage channel is assigned.

If it is desirable to initially introduce the exact elevation voltage into the store, a color display circuit such as described with reference to FIGURE 1 may be employed in lieu of the conventional monochrome display 101. During acquisition the potential of battery 121 may be varied until the color of the acquisition spot of the tube 65 is matched with the color indication of the target to be tracked. The elevation voltage introduced into store A is then substantially correct. It is pointed out, however, that this requires additional circuitry and generally is not preferred since the elevation voltage is promptly corrected during the next azimuth scan of the antenna 7.

Assuming that targets have been acquired in stores A, B, C, and D, the operation of circuitry for the automatic target tracking is next considered. An inspection sequencing switch 147 is driven at constant speed periodically sampling the information in each store. The speed at which the switch is driven is preferably that which affords the most up-to-date information, and generally is such that the information in each store is sampled at least once during each 360° azimuth scan of the Foster scanner 7. If store A is selected to store the coordinates of a target at a particular bearing, the elevation scanning at that azimuth causes an electrical charge to be deposited on a corresponding portion of the storage medium, the screen 48 of the storage tube 47. The amount of charge, as described previously with reference to FIGURE 1, is proportional to the elevation of the target.

After the charge has been deposited thereon, the inspection sequencing switch 147 programs sampling the data in that store. At that time, a positive potential from a battery 158 is coupled through switch arm 153 and applied to the control grid of the storage tube 47 by the lead 160 to turn on the tube's reading electron beam. Simultaneously, the X and Y coordinate signals representative of the voltages to which the capacitors 141 and 143 are charged are coupled respectively through arms 155 and 157 and leads 165 and 167 to an inspection sweep generator and positioner circuit 169. The generator and positioner circuit includes separate saw-tooth generators 171 and 173, which may be free running if desired, the output signals of which are developed across different load resistors 175 and 177. Also developed across the resistors are the X and Y signals from the capacitors 141 and 143. The composite signal obtained by developing both the positioning signals and the sawtooth signals across the resistors 175 and 177 are coupled to different D.-C. amplifiers 179 and 181 and thence to the horizontal and vertical deflection coils of the storage tube 47.

The effect of the sweep generator and positioner circuit 169 is to estimate the position of the target having its data recorded in store A and to bracket the electrical charge corresponding to said target with a small television type reading raster. The raster may comprise as few as ten horizontal scan lines. The position of the charge pattern relative to the center of the "inspection raster" determines the amount of correction, if any, which is to be made in the storage capacitors 141, 143. If target A has not moved in the time interval between successive 360° azimuth scans of the antenna 7 the capacitors are already charged to the proper voltages and no correction is necessary. Assuming, however, that the target has moved from its previous position, but not sufficiently to have moved out of the area covered by the inspection raster, correction of the capacitor voltages in store A is required and may be achieved in the following manner.

Referring again to FIGURES 2–a and 2–b, the video signals derived from the inspection reading process are amplified in a video amplifier 185 and applied to a pulse position discriminator 187. The relative occurrence of the video signals with respect to the center of the rising portion of the sawtooth signals from the inspection sweep generators 171 and 173 determines the polarity and amplitude of correction to be conveyed to the capacitors 141 and 143. A more detailed explanation of the pulse position discriminator preferred in the present system is provided in a copending application Serial No. 239,548, filed July 31, 1951, in the name of Robert E. Wilson.

The correction signals from the discriminator 187 and the video signal from the video amplifier 185 are then coupled by leads 189, 191, and 193, respectively, through switch arms 195, 197, and 199 of the inspection sequencing switch 147 to separate circuits for correcting the voltages of capacitors 141, 143, and 145. Each of these three capacitors are preferably connected between the grid and plate electrodes of different amplifiers to take advantage of "Miller effect" and to prevent dissipation of the capacitor charge during voltage sampling.

Referring to FIGURE 5, assume that the voltage at the grid of tube 210, the tube to which one terminal of capacitor 141 is connected, is +1.5 volts and that the correction voltage is +0.05 volt. The new voltage analogue will then be +1.55 volts. The positive going +0.05 volt correction signal is coupled through a coupling capacitor 201, developed across a grid leak resistor 203, and amplified in an amplifier 205. The amplifier output signal is then applied to a cathode follower stage 209 wherein positive-going and negative-going signals, respectively, are developed in the anode and cathode circuits thereof. The negative-going pulse causes a diode 213, connected between the cathode of the cathode follower 209 and the grid of the amplifier 210, to conduct until the charge on capacitor 141 reaches a value such that the grid voltage with respect to the cathode is +1.55 volts. Simultaneously, the positive-going pulse developed in the cathode follower anode circuit is differentiated and applied to the anode of a diode 211 having its cathode connected to the grid of amplifier 210. The conduction of diode 211 tends to reduce the charge of capacitor 141, however this tendency is not significant since the conduction interval of diode 213 is relatively longer and is controlling in correcting the charge voltage to its final value.

In the event that the capacitor correction signal is a negative voltage, the diode 213 initially does not conduct. The differentiated pulse applied to the plate of diode 211 causes electrons to flow from the lower plate of capacitor 141 and through the diode 211 overcorrecting the voltage charge of the capacitor. The negative potential at the grid of amplifier 210 is then sufficiently positively increased to cause conduction in diode 213 adjusting the charge voltage to its final correct value. It is pointed out that while two of the three signals coupled to the separation correction circuits are either positive or negative correction signals and the third signal is a pulse height analogue of elevation, the circuitry and mode of circuit operation for all three correction circuits is substantially identical to the circuitry and operation described above. Accordingly, the circuitry for correcting the charge voltages of capacitors 143 and 145 is designated by single and double prime reference numbers, respectively.

From the foregoing description it may be seen that the information stored is periodically sampled and corrections made at some predetermined sampling rate. The Foster scanner generally requires at least five seconds for a complete hemispheric search, hence it is apparent that data from a large number of targets may be inspected and corrected in this manner. The three-coordinate information available in each of the stores A, B, C, D, etc. is also available for sampling by the aforementioned display sequencing switch 128. One set of display sampling terminals is provided for each signal storage channel provided by the system. Since the signals sampled thereby are utilized to provide a color display of the targets being automatically tracked, the display sequencing switch 128 is driven such a speed that the coordinates of all targets being tracked may be displayed of the order of 30 times per second. The elevation analogue of voltage stored in each signal channel actuates the level separator circuit 55 turning on the proper electron gun or combinations of guns in the tri-color tube 65 to produce the image color on the phosphor screen thereof while the X and Y coordinate signals determine the position of the color image on said screen.

While the foregoing system has been described in connection with a PPI type signal presentation, the system is equally suitable for B-scan and other related displays. Also, the system is not limited to aircraft control systems but may be employed with equal facility by using the capacitor voltages stored in each memory store for gunfire control. Moreover, the nodding type of radar lobe generation may be replaced by a radar in which a multiplicity of differently directed lobes are simultaneously generated and the elevation characteristic thereof determined by lobe comparison.

What is claimed is:

1. The method of recording three-dimensional radar information including bearing, range, and elevation angle or altitude data from a plurality of radar targets on a two-dimensional medium comprising the steps of deflecting an electron beam across said medium along a path determined by said target bearing data, during said deflection deriving a wave signal train including radar target range data, limiting the amplitude of said wave train to a predetermined constant value, controlling the amplitude of said amplitude limited wave train as a function of the elevation angle or altitude of said targets, modulating said electron beam with said amplitude controlled wave signal train to write said three-dimensional information on said medium as an electrical charge pattern, deriving from said variable intensity charge pattern a further wave train having amplitude variations corresponding to variations in intensity of said electrical charge pattern, separating components of said further wave train according to their respective amplitude levels, and applying said separated wave train components to a color display device whereby the elevation angle or altitude of said targets are displayed in characteristic colors.

2. A system for recording three-dimensional radar information on a two-dimensional medium comprising means for deriving three-dimensional information including range, bearing, and elevation angle or altitude data from a plurality of radar target objects, means for producing a writing beam of electrons, a two-dimensional signal recording medium, means for progressively deflecting said electron beam across said medium along a path in accordance with the bearings of said targets, means effective during each of said deflections for deriving a wave signal train including target range data, means for amplitude-modulating said wave trains with target elevation angle or altitude data, means for modulating said writing beam with said derived modulated wave train to establish an electrical charge pattern of variable intensity on said medium, means for scanning said medium with a reading beam of electrons to obtain a variable amplitude video signal train, and means including signal separator means responsive to different amplitude levels of said video train for displaying signals coupled through said signal separator means in characteristic colors.

3. A system for recording three-dimensional radar information on a two-dimensional medium comprising means for deriving three-dimensional information including range, bearing, and elevation angle or altitude data from a plurality of radar target objects, an electrical storage tube including a two-dimensional signal storage medium and means for producing a writing beam of electrons and a reading beam of electrons, deflection means for progressively deflecting said writing beam across said medium along a path in accordance with the bearings of said targets, means effective during each of said deflections for deriving a wave signal train including target range data, means for generating a reference signal, means for effectively combining said reference signal with said wave train to control the amplitude of said wave train as a function of target elevation angle or altitude, means for modulating said writing beam with said amplitude-controlled wave train to establish an electrical charge pattern of variable intensity on said signal storage medium, means for scanning said medium with said reading beam to obtain a variable amplitude video signal train, and means including signal separator means responsive to different amplitude levels of said video train for displaying signals coupled therethrough in a characteristic color.

4. A system for recording three-dimensional radar information on a two-dimensional medium comprising means for deriving three-dimensional infomation including range, bearing, and elevation angle or altitude data from a plurality of radar target objects, an electrical storage tube including a two-dimensional signal storage medium and means for producing a writing beam of electrons and a reading beam of electrons, deflection means for progressively deflecting said writing beam across said medium along a path in accordance with the bearings of said targets, means effective during each of said deflections for deriving a wave signal train including target range data, means for limiting the amplitude of said wave signal train to a predetermined value, means for generating a reference signal having a slope which varies linearly with time, means for combining said reference signal with said limited wave train to control the amplitude of said wave train as a function of target elevation angle or altitude, means for modulating said writing beam with said amplitude-controlled wave train to establish an electrical charge pattern of variable intensity on said signal storage medium, means for scanning said storage medium with said reading beam to obtain a variable amplitude video signal train, and means including signal separator means responsive to different amplitude levels of said video train for displaying signals coupled therethrough in a characteristic color.

5. A three-dimensional radar target tracking system for the automatic tracking in range, azimuth, and elevation angle or altitude of selected ones of a plurality of radar targets comprising, means for producing a writing beam of electrons, a two-dimensional signal recording medium, means for progressively deflecting said electron beam across said medium along a path in accordance with the bearings of said targets, means effective during each of said deflections for deriving a wave signal train including target range data, means for modulating said wave trains with target elevation angle or altitude data whereby said writing beam is modulated by said modulated wave trains to establish a variable intensity electrical charge pattern on said medium whereby the positions of electrical charges on said medium correspond to the ranges and azimuths of said plurality of targets and the intensities of said charges are proportional to the elevation angles or altitudes thereof, means for designating certain ones of said plurality of targets for automatic tracking thereof, a storage unit for storing voltages proportional to the range, azimuth, and elevation angle or altitude of each of said designated targets, and means for periodically inspecting electrical charges on said medium corresponding to said designated targets including means responsive to said inspection for correcting the voltages in said storage units.

6. A system as claimed in claim 5 including means for sequentially sampling signals stored in each of said storage units at a rate substantially greater than the rate of said periodic inspection, a color display device, and means intermediate said storage units and said display device responsive to said sampled signals for displaying in color the range and azimuth location of each of said designated targets, the image color of each target displayed thereby being a measure of the elevation thereof.

7. A system as claimed in claim 5 wherein said means for periodically inspecting said charges includes means for generating a television type scanning raster and means sequentially sampling each of said storage units for positioning said raster on said medium in accordance with the last known range and azimuth proportional voltages stored in the storage unit for the particular target charge being inspected.

8. A three-dimensional radar target tracking system for the automatic tracking range, azimuth, and elevation angle or altitude of selected ones of a plurality of radar targets comprising, means for producing a writing beam of electrons, a two-dimensional signal recording medium, means for progressively deflecting said electron beam across said medium along a path in accordance with the bearings of said targets, means effective during each of said deflections for deriving a wave signal train including target range data, means for modulating said wave trains with target elevation angle or altitude data whereby said writing beam is modulated by said modulated wave trains to establish a variable intensity electrical charge pattern on said medium whereby the positions of electrical charges on said medium comprising said pattern correspond to the ranges and azimuths of said plurality of targets and the intensities of said charges are proportional to the elevation angles or altitudes thereof, means for designating certain ones of said plurality of targets to be tracked including means for deriving preliminary voltages proportional to at least two of the three-dimensional coordinates of designated targets, a storage unit for each designated target for storing said preliminary voltages, and means for periodically inspecting electrical charges on said medium corresponding to said designated targets for correcting the coordinate voltages in each of said storage units.

9. A three-dimensional radar target tracking system for the automatic tracking in range, azimuth, and elevation angle or altitude of selected ones of a plurality of radar targets comprising, means for producing a writing beam of electrons, a two-dimensional signal recording medium, means for progressively deflecting said electron beam across said medium along a path in accordance with the bearings of said targets, means effective during each of said deflections for deriving a wave signal train including target range data, means for modulating said wave trains with target elevation angle or altitude data whereby said writing beam is modulated by said modulated wave trains to establish a variable intensity electrical charge pattern on said medium whereby the positions of electrical charges of said medium comprising said pattern correspond to the ranges and azimuths of said plurality of targets and the intensities of said charges are proportional to the elevation angles or altitudes thereof, means for designating certain ones of said plurality of targets for automatic tracking thereof, a storage unit for storing voltages proportional to the range, azimuth, and elevation angle or altitude of each of said designated targets, means for periodically sampling voltages in each of said stores, and means responsive to said voltage sampling for inspecting said designated targets whereby said stored voltages are periodically corrected.

10. A system for recording three-dimensional radar information on a two-dimensional medium comprising means for deriving three-dimensional information including range, bearing, and elevation angle or altitude data from a plurality of radar target objects, means for producing a writing beam of electrons, a two-dimensional signal recording medium, means for progressively deflecting said electron beam across said medium along a path in accordance with the bearings of said objects, means effective during each of said deflections for deriving wave signal trains including target range data, means for limiting the amplitude of said wave trains to a predetermined constant value, means for amplitude-modulating said amplitude limited wave trains with target elevation angle or altitude data whereby said writing beam is progressively modulated by said amplitude-modulated wave trains to establish an electrical charge pattern of variable intensity on said medium, means for scanning said medium with a reading beam of electrons to obtain variable amplitude video signal trains, and means including signal separator means responsive to different amplitude levels of said video trains for displaying signals coupled through said separator means in characteristic colors.

11. A system for storing and displaying three elements of information comprising, means for producing a beam of electrons, a two-dimensional electrical charge storage member, means for deflecting said electron beam across said charge storage member along a path determined by a first element of said information, means effective during each of said deflections for deriving a wave signal train including a second element of said information, means for modulating said derived signal train with a third element of said information, means for modulating said electron beam with said derived modulated signal train to establish a variable intensity electrical charge pattern on said charge storage member, means for deriving from said variable intensity electrical charge pattern further wave trains having amplitude variations corresponding to variations in intensity of said electrical charge pattern, and means including signal separator means responsive to different amplitude levels of said further wavetrains for displaying signals coupled through said signal separator means in characteristic colors.

12. A system for storage and displaying three elements of information comprising, means for producing a beam of electrons, a two-dimensional electrical charge storage member, means for deflecting said electron beam across said charge storage member along a path determined by a first element of said information, means effective during each of said deflections for deriving a wave signal train including a second element of said information, means for limiting the amplitude of said wave train to a predetermined constant value, means for modulating said amplitude limited wave train with a third element of said information, means for modulating said electron beam with said derived modulated signal train to establish a variable intensity electrical charge pattern on said charge storage member, means for deriving from said variable intensity electrical charge pattern further wave trains having amplitude variations corresponding to variations in intensity of said electrical charge pattern, and means including signal separator means responsive to different amplitude levels of said further wave trains for displaying signals coupled through said signal separator means in characteristic colors.

References Cited in the file of this patent
UNITED STATES PATENTS

| | | |
|---|---|---|
| 2,426,189 | Espenschied | Aug. 26, 1947 |
| 2,453,454 | Norwine | Nov. 9, 1948 |
| 2,516,356 | Tull et al. | July 25, 1950 |
| 2,543,753 | Ayres | Mar. 6, 1951 |
| 2,602,921 | Peters | July 8, 1952 |
| 2,606,318 | Haworth | Aug. 5, 1952 |